US010157103B2

(12) United States Patent
Gostev et al.

(10) Patent No.: US 10,157,103 B2
(45) Date of Patent: Dec. 18, 2018

(54) EFFICIENT PROCESSING OF FILE SYSTEM OBJECTS FOR IMAGE LEVEL BACKUPS

(71) Applicant: Veeam Software AG, Baar (CH)

(72) Inventors: Anton Gostev, Saint-Petersburg (RU); Alexander Baranov, Saint-Petersburg (RU)

(73) Assignee: Veeam Software AG, Baar (CH)

( * ) Notice: Subject to any disclaimer, the term of this patent is extended or adjusted under 35 U.S.C. 154(b) by 300 days.

(21) Appl. No.: 14/918,453

(22) Filed: Oct. 20, 2015

(65) Prior Publication Data
US 2017/0109239 A1    Apr. 20, 2017

(51) Int. Cl.
G06F 17/00    (2006.01)
G06F 11/14    (2006.01)

(52) U.S. Cl.
CPC ...... G06F 11/1451 (2013.01); G06F 11/1435 (2013.01); *G06F 2201/80* (2013.01)

(58) Field of Classification Search
None
See application file for complete search history.

(56) References Cited

U.S. PATENT DOCUMENTS

| | | |
|---|---|---|
| 5,778,395 A | 7/1998 | Whiting et al. |
| 5,890,169 A | 3/1999 | Wong et al. |
| 6,189,081 B1 | 2/2001 | Fujio |
| 6,453,383 B1 | 9/2002 | Stoddard et al. |
| 6,665,779 B1 | 12/2003 | Polfer et al. |
| 6,742,147 B1 | 5/2004 | Sasaki et al. |
| 6,931,558 B1 | 8/2005 | Jeffe et al. |
| 7,093,086 B1 | 8/2006 | Van Rietschote |
| 7,191,299 B1 | 3/2007 | Kekre et al. |

(Continued)

FOREIGN PATENT DOCUMENTS

| | | |
|---|---|---|
| EP | 0767431 A1 | 4/1997 |
| WO | WO 2015/047310 A1 | 4/2015 |

OTHER PUBLICATIONS

Notification of Transmittal of the International Search Report and the Written Opinion of the International Searching Authority for Application No. PCT/US2011/040358, dated Jan. 19, 2012; 9 pages.

(Continued)

*Primary Examiner* — Hung D Le
(74) *Attorney, Agent, or Firm* — Sterne, Kessler, Goldstein & Fox, PLLC

(57) ABSTRACT

Systems, methods, and computer program products are provided for selective processing of file system objects for an image level backup. An example method receives backup parameters for an image level backup. The backup parameters include a selection of at least one file system object to include. The method attaches to a source disk as a block device. The source disk corresponds to the selected at least one file system object, and a file system includes a file allocation table (FAT). The method determines file system objects of the source disk to be excluded from the image level backup. The method issues file deletion API calls to initiate deletion of the determined file system objects. The method stores FAT content change caused by the issued file deletion API calls. The method creates a reconstructed disk image from the source disk based on the stored FAT content change.

21 Claims, 5 Drawing Sheets

(56) References Cited

U.S. PATENT DOCUMENTS

| | | | |
|---|---|---|---|
| 7,254,682 B1 | 8/2007 | Arbon | |
| 7,555,620 B1 * | 6/2009 | Manley | G06F 11/1464 |
| | | | 707/999.202 |
| 7,694,088 B1 * | 4/2010 | Bromley | G06F 11/1458 |
| | | | 711/162 |
| 7,831,789 B1 | 11/2010 | Per et al. | |
| 8,060,476 B1 | 11/2011 | Afonso et al. | |
| 8,156,165 B2 | 4/2012 | Malueg et al. | |
| 8,200,637 B1 * | 6/2012 | Stringham | G06F 11/1451 |
| | | | 707/670 |
| 8,682,862 B2 | 3/2014 | Rosikiewicz et al. | |
| 8,805,789 B2 * | 8/2014 | Berman | G06F 11/1469 |
| | | | 707/649 |
| 8,996,468 B1 | 3/2015 | Mattox | |
| 9,384,094 B2 * | 7/2016 | Teli | G06F 11/1417 |
| 2001/0051954 A1 | 12/2001 | Yamashita | |
| 2003/0142960 A1 | 7/2003 | Yokota et al. | |
| 2004/0153689 A1 | 8/2004 | Assaf | |
| 2005/0165853 A1 | 7/2005 | Turpin et al. | |
| 2005/0177777 A1 | 8/2005 | Seaburg et al. | |
| 2005/0259542 A1 | 11/2005 | Mochizuki | |
| 2007/0186070 A1 | 8/2007 | Federa et al. | |
| 2007/0294320 A1 | 12/2007 | Yueh et al. | |
| 2008/0028004 A1 | 1/2008 | Lee et al. | |
| 2008/0069522 A1 | 3/2008 | Okada et al. | |
| 2008/0253573 A1 * | 10/2008 | Sakurai | H04N 1/32609 |
| | | | 380/278 |
| 2008/0275924 A1 | 11/2008 | Fries | |
| 2009/0055452 A1 | 2/2009 | Tang | |
| 2009/0094603 A1 | 4/2009 | Hiltgen et al. | |
| 2009/0164529 A1 | 6/2009 | McCain | |
| 2009/0216970 A1 | 8/2009 | Basler et al. | |
| 2009/0222496 A1 | 9/2009 | Liu et al. | |
| 2009/0313447 A1 | 12/2009 | Nguyen et al. | |
| 2010/0070725 A1 | 3/2010 | Prahlad et al. | |
| 2010/0076932 A1 | 3/2010 | Lad | |
| 2010/0107158 A1 | 4/2010 | Chen et al. | |
| 2010/0132022 A1 | 5/2010 | Venkatasubramanian | |
| 2010/0332534 A1 | 12/2010 | Chang | |
| 2011/0087874 A1 * | 4/2011 | Timashev | G06F 9/44589 |
| | | | 713/100 |
| 2011/0196842 A1 | 8/2011 | Timashev et al. | |
| 2011/0307657 A1 * | 12/2011 | Timashev | G06F 11/1451 |
| | | | 711/112 |
| 2012/0017114 A1 * | 1/2012 | Timashev | G06F 11/1469 |
| | | | 714/15 |
| 2014/0074787 A1 * | 3/2014 | Berman | G06F 11/1451 |
| | | | 707/639 |
| 2014/0250093 A1 | 9/2014 | Prahlad et al. | |
| 2016/0232060 A1 * | 8/2016 | Nanivadekar | G06F 17/30117 |

OTHER PUBLICATIONS

Extended European Search Report directed to related European Patent Application No. 16194913, dated Mar. 20, 2017; 9 pages.

\* cited by examiner

EFFICIENT PROCESSING OF FILE SYSTEM OBJECTS FOR IMAGE LEVEL BACKUPS

FIELD

The present invention generally relates to methods for efficiently backing up physical and virtual machine data into image level backups and replicas.

BACKGROUND

Image level backups used for disaster recovery present new challenges as compared to legacy file system level backups. In particular, the size of disk images that needs to be backed up requires longer times to backup. Backups of large disk images also significantly increase backup file storage requirements.

As compared to file level backups, which are typically set to backup only required file system objects, image level backups save complete images of backed up disks. Thus, unlike file-level backups, conventional image level backups typically include unnecessary data blocks belonging to file system objects that are of no value to users, deleted file system objects, file system objects marked for deletion, unallocated space, and unused space. While currently available commercial backup solutions are able to efficiently remove white spaces (e.g., by using compression and deduplication), other unneeded data blocks mentioned above are still processed as part of image-level backups. This slows down backup performance and requires additional backup storage space. Thus, there is a need for methods of excluding unnecessary data from image level backups.

SUMMARY OF THE INVENTION

Accordingly, what is needed are tools which enable backup operators and administrators to selectively reduce the amount of data that needs to be read from a source disk and stored in a corresponding image level backup. What is further needed are systems, methods, and computer program products for selective processing of objects (i.e., selective processing) within image level backups.

Embodiments of the present invention include methods, systems, and computer program products for efficient selective processing of image level backups. As would be understood by one skilled in the relevant art(s), the methods described herein with reference to image level backups can also be applied to other image level disaster recovery techniques, such as creating replicas via replication and simple copying of images.

An example method receives backup parameters for an image level backup. The backup parameters include a selection of at least one file system object to include in the image level backup. The method attaches to a source disk as a block device. The source disk corresponds to the selected at least one file system object, and a file system includes a file allocation table (FAT). The method determines file system objects of the source disk to be excluded for the image level backup based on the selection of the at least one file system object. The method issues file deletion API calls to initiate deletion of the determined file system objects from the source disk. The method stores FAT content change caused by the issued file deletion API calls of the determined file system objects. The method creates a reconstructed disk image from the source disk based on the stored FAT content change.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the relevant art to make and use the invention.

Figure 1:
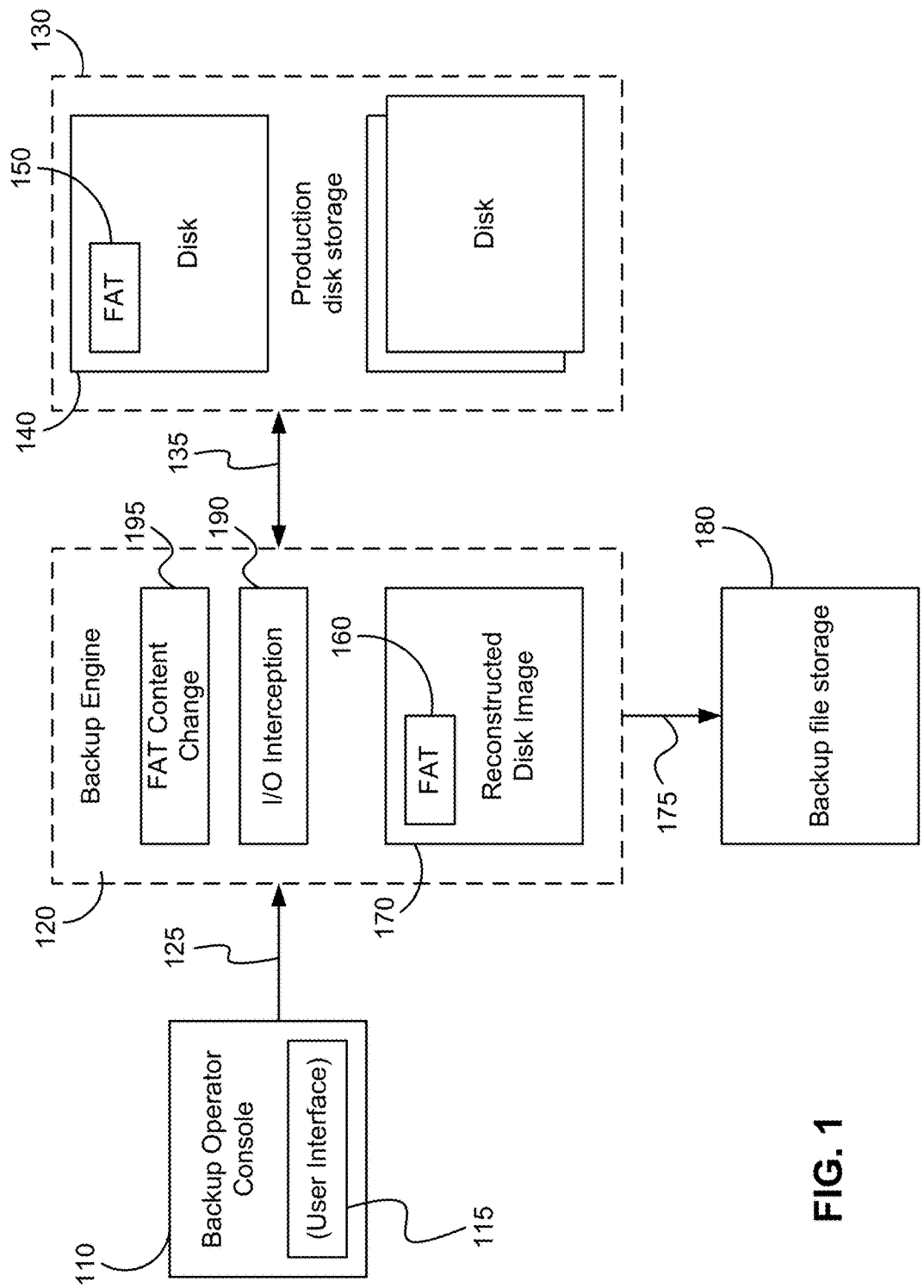
FIG. 1 illustrates a system architecture for selective backup processing, in accordance with an embodiment of the present invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION OF THE INVENTION

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, non-transitory computer readable media having instructions stored thereon, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

Unless specifically stated differently, a user, a backup operator, and an administrator are interchangeably used herein to identify a human user, a software agent, or a group of users and/or software agents. Besides a human user who may perform selective backups, a software application or agent may sometimes process image level backups. Accordingly, unless specifically stated, the terms "backup operator," "administrator," and "user" as used herein are not limited to a human being.

As used herein, in an embodiment, the term "server" encompasses computing devices that are designed to function as one or more of file servers, email servers, Domain Name System (DNS) servers, Domain Controller (DC) servers, application servers, database servers, web servers, firewall servers, other enterprise servers, and back end servers. A server may comprise of one or more server machines. A server may be implemented as collection of servers such as a server farm or server cluster. For example, web servers may be commercially available server machines with one or more central processing units (CPUs). Alternatively, these web servers may comprise multiple computing devices and/or computing functionality hosted on multiple server machines (i.e., a server farm).

The present invention generally relates to systems, methods, and computer program products for selective processing of image level backups. Embodiments of selective processing of image level backups achieve at least two key improvements over conventional image level backup optimization techniques.

First, in contrast to conventional solutions, embodiments of the present invention do not rely on potentially dangerous approach of physically deleting data from the source computer, or from the source computer's snapshot image. Instead, data deletion requests are intercepted before the requests reach the target disk. Intercepting deletion requests allows the backup process to perform backup processing of any types of source disks, including source disks that are mounted as read-only block devices for backup purposes. Mounting source disks as read-only block devices are a good technique to ensure safety of backing up source images.

Secondly, in contrast to conventional solutions, embodiments of the present invention do not require additional processing during restoration of a backed up computer before the backed up computer becomes usable. Examples of the additional processing include removing file records of deleted files from the FAT, which may take significant time. Conventional solutions' additional processing during restoration may significantly impact recovery time, and the additional processing is required every time the same backup image is restored. Instead, embodiments of the present invention perform the additional processing during the backup stage. The result of the backup process is a fully processed, ready-to-go image that does not require the additional processing during restoration.

As a part of selective processing of an image level backup, the backup disk image usually comprises a modified FAT that is different from the FAT of the source disk. However, figuring out correct changes to the FAT in the source disk to make the FAT in the destination back disk image can be complex.

One way to create a modified FAT in the back disk image is to first fetch a copy of the FAT from the source disk and save the fetched copy as the backup FAT for the backup disk image. Then, the backup process may modify the backup FAT by removing references to any file system objects not selected for backup. However, this approach may require pausing concurrent write operations to the source disk while fetching the copy of the FAT in the source disk. Further, determining which references in the backup FAT for removal (i.e., the references that point to file system objects excluded for backup) can be time consuming and may require a complete analysis of the source disk and the FAT in the source disk.

To efficiently create a backup FAT for the backup disk image, in one embodiment, the backup process may issue file deletion API calls of file system objects excluded for backup. Then, the backup process may intercept all the write requests going to the FAT section of the source disk. The write requests are triggered by the file deletion API calls, and the backup process can leverage the file system driver to automatically perform modifications to the FAT in the source disk, thus creating the required content for the backup FAT. The backup process creates the FAT in the backup disk image based on the saved changes to the FAT (for changed portions) and the FAT in the source disk (for unchanged portions). The saved changes to the FAT and the FAT in the source disk also allow the backup process to avoid copying unnecessary disk blocks from the source disk, further improving the efficiency of the backup process.

Selective Backup System Architecture

FIG. 1 depicts system architecture 100 for processing selective image level backups, in accordance with an embodiment of the invention. An operator console 110 includes a user interface (UI) 115 for backup operators and administrators. In an embodiment, the UI 115 may be displayed on computer display 430 shown in FIG. 4. UI 115 can be used to add and select individual file system objects to be included in, or excluded from an image level backup. As used herein, an image level backup is a backup of the disk images of a physical or virtual machine (VM) corresponding to a server or computer. Because any physical machine can be backed up on image level (for example, by leveraging an agent), the invention applies to both image level backup of both virtual and physical machines.

As used herein, a "virtual machine" (VM) is a software implementation of a machine such as a server, computer, or other computing device that supports the execution of a complete operating system (OS) and executes application programs like a physical machine. A VM duplicates the functionality of a physical machine implemented in hardware and software. Software applications and the OS running on a VM are limited to the resources and abstractions provided by the VM. In an embodiment, virtual machines (VMs) are viewable within an overall virtual infrastructure. According to an embodiment of the invention, the backup file system objects selected to be backed up can be located in production disk storage 130, which includes one or more disks 140 which form parts of a production disk storage. As described in detail below, embodiments of the invention read data 135 to be backed up by either attaching an image of disk 140 to a backup engine 120 (in case of virtual machine), or by leveraging an agent inside each processed machine to get data from disk 140 (in case of physical or virtual machine). Herein, the phrase "source disk" is used to refer to storage in production disk storage 130 to be backed up, such as disk 140, which may be a disk of a physical machine or a disk image of a virtual machine.

UI 115 can also be used to remove a previously selected file system object from an image level backup to be processed. Operator console 110 can also be used to enter and configure other backup parameters 125 for an image level backup. For example, in the exemplary embodiment depicted in FIG. 3, UI 115 can be used to disable selective image level processing for a backup, to process all but a selected subset of file system objects in a backup, or to include (copy) only selected file system objects in an image level backup.

Figure 3:
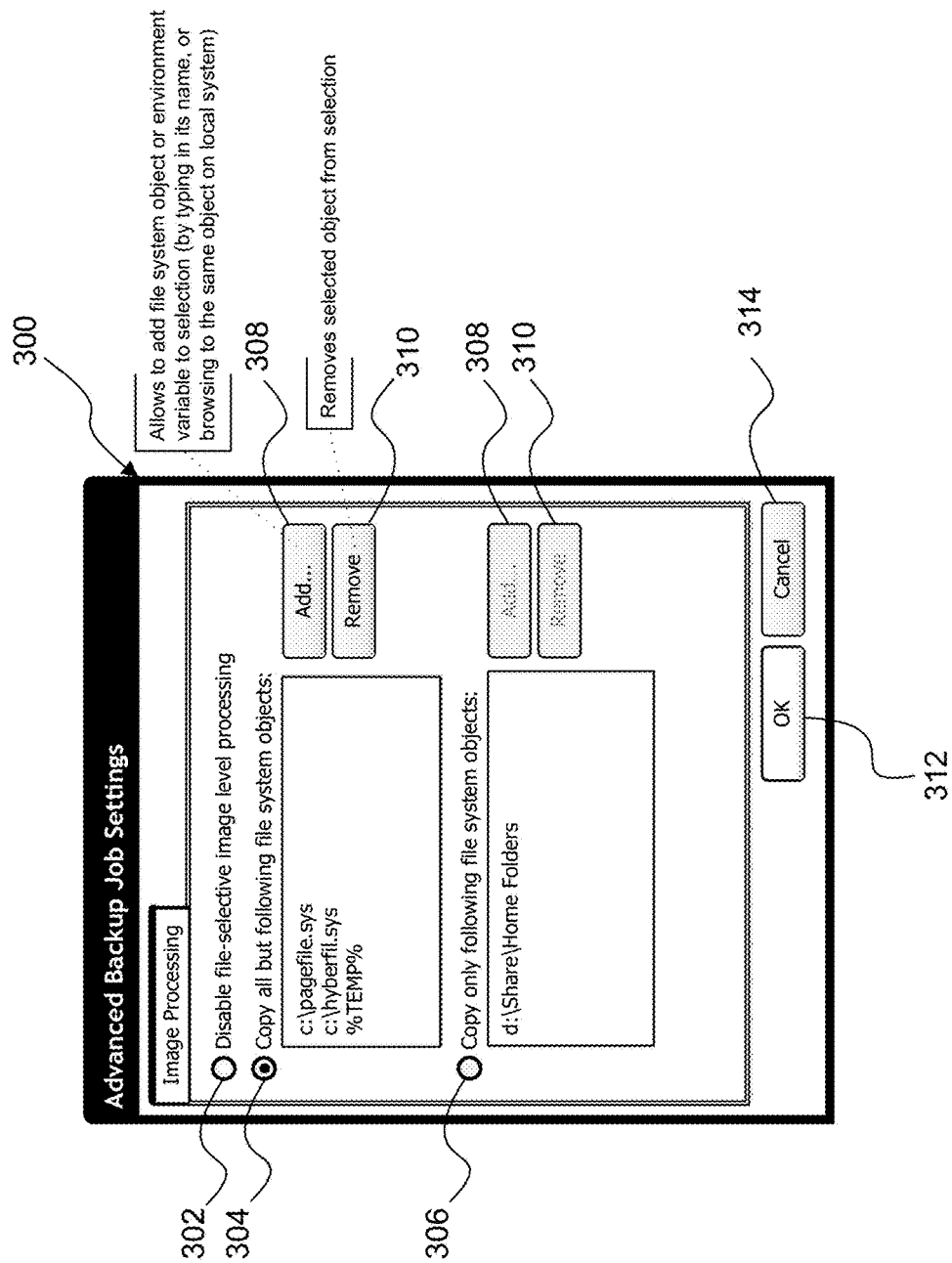
FIG. 3 illustrates an exemplary graphical user interface (GUI), wherein objects can be selected for image level backup processing, in accordance with an embodiment of the invention.

In the exemplary embodiments illustrated in FIGS. 1 and 3, operator console 110 includes a backup object selection interface 300 for selecting machine's file system objects to backup for an image level backup of a machine. Selections of file system objects to include and exclude are received by backup engine 120 as backup parameters 125. According to an embodiment, the file system objects to be included may be programmatically determined based upon the file system objects selected to be excluded. After acquiring backup parameters 125, backup engine 120 connects to production disk storage 130 and initiates block level access to read data 135 from the corresponding disk 140.

In accordance with an embodiment of the invention, backup engine 120 is an application comprising modules configured to process a selective image level backup. Backup engine 120 may be running on a backup server. In the exemplary embodiment depicted in FIG. 1, backup engine 120 is configured to receive backup parameters 125 from backup operator console 110. In an embodiment, the received backup parameters 125 are acquired by a receiving module (not shown). Backup engine 120 comprises a block processing module (not shown) configured to read data 135 from production disk storage 130 in order retrieve and parse file allocation table (FAT) 150 of disk 140, which in turn comprises part of production disk storage. In an embodiment, a production server uses disk 140, and a file system (not shown) located on disk 140 includes FAT 150. In one embodiment, FAT 150 data can be retrieved directly from storage, by reading the disk data blocks corresponding to FAT data location. In another embodiment, the FAT data can be retrieved by an agent (not shown) installed in the processed virtual machine or physical computer. The block processing module is further configured to create a reconstructed disk image 170 comprising a modified backup FAT 160. The block processing module is also configured to write an image level backup 175 to backup file storage 180 corresponding to reconstructed disk image 170.

Backup engine 120 further comprises an input/output (I/O) interception module 190. Backup engine 120 may initialize I/O interception module 190. After initialization, I/O interception module 190 may intercept any read or write requests to FAT 150 of source disk image 140. I/O interception module 190 is further configured to analyze the intercepted write requests and store FAT content change 195 on the backup server. In one embodiment, I/O interception module 190 stores FAT content change 195 in the random access memory (RAM) of the backup server. As shown in FIG. 1, I/O interception module 190 is a component of backup engine 120. In another embodiment not shown in FIG. 1, I/O interception module 190 is an independent application running separately from backup engine 120 on the backup server.

Additional functionalities and features of backup engine 120 are discussed below with continued reference to FIG. 1.

As illustrated in FIG. 1, production disk storage 130 can comprise one or more disks (or disk images—in case of virtual machines) 140 corresponding to each disk used by production machine disk storage corresponding to a machine being backed up. Operator console 110 can be used to select file system objects such as, but not limited to, directories, applications, data files, log files, and other file system objects associated with a machine's applications.

As used herein, "disk image" refers to logical storage that has been abstracted and separated from physical storage, such as network-attached storage (NAS), file servers, disks, and other physical storage devices. In an embodiment, a disk image is implemented via virtual storage logic and is viewable within a virtual infrastructure as a storage device containing one or more virtual disks, which are separated from physical storage disks.

In an embodiment, backup engine 120 is an application that functions as a backup agent. According to an embodiment, backup engine 120 is configured to retrieve disk blocks that store file systems' file allocation table (FAT) 150. Backup engine 120 is further configured to intercept write requests to FAT 150 and save FAT content change 195 on the backup server. As used herein, FAT refers to a file allocation table used in a variety of file system architectures for various Operating Systems (OSs) and is not limited to a FAT file system used in MICROSOFT™ Windows. For example, FAT may be a file allocation table for the FAT12, FAT16, FAT32, or exFAT file systems. In another embodiment, FAT may be a Master File Table (MFT) for the NTFS file systems. In yet additional embodiments, FAT may be an allocation table for the EXT2, EXT3, EXT4, HFS or ReFS file systems. According to an embodiment of the invention, the contents of FAT 150 and FAT content change 195 are read to determine the locations of blocks of file system objects selected for inclusion in the image level backup, as specified by a backup operator using operator console 110. In this way, only the disk blocks of the source disk 140 corresponding to selected file system objects need to be read from disk or disk image 140.

In accordance with an embodiment of the invention, a copy of the contents of FAT 150 is made as backup FAT 160, which is optionally modified. The optional modification may include removing references to file system objects that have been excluded from backup per selections made in operator console 110. In another implementation, FAT 160 remains as an unmodified copy of FAT 150. In this case, certain unimportant files, such as temporary files, virtual memory files (i.e., pagefile.sys and other paging files) and hibernation files (i.e., hyberfil.sys), will still be represented in the file system of restored backup 175, but will have empty content (zeroed out data blocks). Unlike conventional techniques, embodiments of the present invention do not look up or process deleted data information.

Backup engine 120 is configured to effectively reconstruct a modified, reconstructed disk image 170 on the fly, while simultaneously compressing and saving backup data 175 to backup file storage 180. In an alternative embodiment, backup engine 120 replicates the reconstructed disk image 170 to a replica VM (not shown). For example, reconstructed disk image 170 can be replicated to remote file storage. Backup engine 120 can also copy reconstructed disk image 170 to another local or remote storage device. For example, in cases where backup 175 will be used to perform a restoration onto a replica of a VM, such as a standby VM or failover VM, reconstructed disk image 170 is replicated to the backup storage accessible from a hypervisor host running a replica VM.

According to an embodiment, reconstructed disk image 170 is created by using modified data blocks corresponding to backup FAT 160, and then retrieving and applying only those image blocks of disk 140 that correspond to the file system objects selected for backup in UI 115. Instead of including all sequential blocks of disk image 140, reconstructed disk image 170 skips blocks corresponding to file system objects that were selected for exclusion based on settings provided in UI 115 of operator console 110. According to an embodiment, exclusions can be pre-configured. For example, it may be pre-configured that files such as paging and virtual memory files (e.g., swap files), are always excluded from the backup.

In accordance with an embodiment, as reconstructed disk image 170 is being created using backup FAT 160, it is simultaneously compressed and stored in backup file storage 180 as a backup data 175. In an embodiment, disk image data blocks containing data that is to be excluded from processing is substituted by zeroed data blocks in reconstructed disk image 170. Thus, zeroed data blocks are written to reconstructed disk image 170 instead of actual data blocks belonging to objects selected for exclusion in UI 115. In this way, the storage space needed in backup file storage 180 to store reconstructed disk image 170 is reduced in cases when data is compressed and/or deduplicated before saving it to a backup file.

In an embodiment of the invention, backup data 175 can be made available to data consuming processes as a local volume so that the reconstructed disk image 170 can be later used for additional processing, verification and/or restore the backed up file system objects. In alternative embodiments, backup file storage 180 is made available to data consuming processes as remote storage via public or proprietary storage access protocols such as, but not limited to the Network File System (NFS), Common Internet File System (CIFS), and Internet Small Computer System Interface (iSCSI). Examples of additional processing include mounting reconstructed disk image 170 to a server as a volume, creating, updating or deleting some file system objects using native OS and third party tools, and committing the changes to backup data 175. Example methods for restoring file system objects and items from an image level backup are described in U.S. patent application Ser. No. 12/901,233, filed on Oct. 8, 2010 entitled "Item-Level Restoration from Image Level Backups," which incorporates by reference and claims priority to U.S. Patent Provisional Application No. 61/250,586, filed on Oct. 12, 2009 entitled "Item-Level Restoration from Image Level Backup." U.S. patent application Ser. No. 12/901,233 and U.S. Patent Provisional Application No. 61/250,586 are incorporated by reference herein in their entireties. Example methods for displaying and verifying file system objects from an image level backup without fully extracting, decompressing, or decrypting the image level backup are described in U.S. patent application Ser. No. 12/901,233, which incorporates by reference and claims priority to U.S. Provisional Patent Application No. 61/302,743, filed on Feb. 9, 2010 and entitled "Systems, Methods, and Computer Program Products for Verification of Image Level Backups," which are incorporated herein by reference in their entireties. Example methods for recovering file system file system objects from an image level backup without requiring the restoration process to be executed on a computer running an operating system (OS) that supports the virtual disk file system type backed up in the image level backup are described in U.S. patent application Ser. No. 13,021,312 filed on Feb. 4, 2011 and entitled "Cross-Platform Object Level Restoration From Image Level Backups," which incorporates by reference and claims priority to U.S. Provisional Patent Application No. 61/302,877, filed on Feb. 9, 2010, and entitled "Cross-Platform Object Level Restoration From Image Level Backups." U.S. patent application Ser. No. 13,021,312 and U.S. Provisional Patent Application No. 61/302,877 are both incorporated herein by reference in their entireties.

Selective Image Level Backup Methods

Figure 2A:
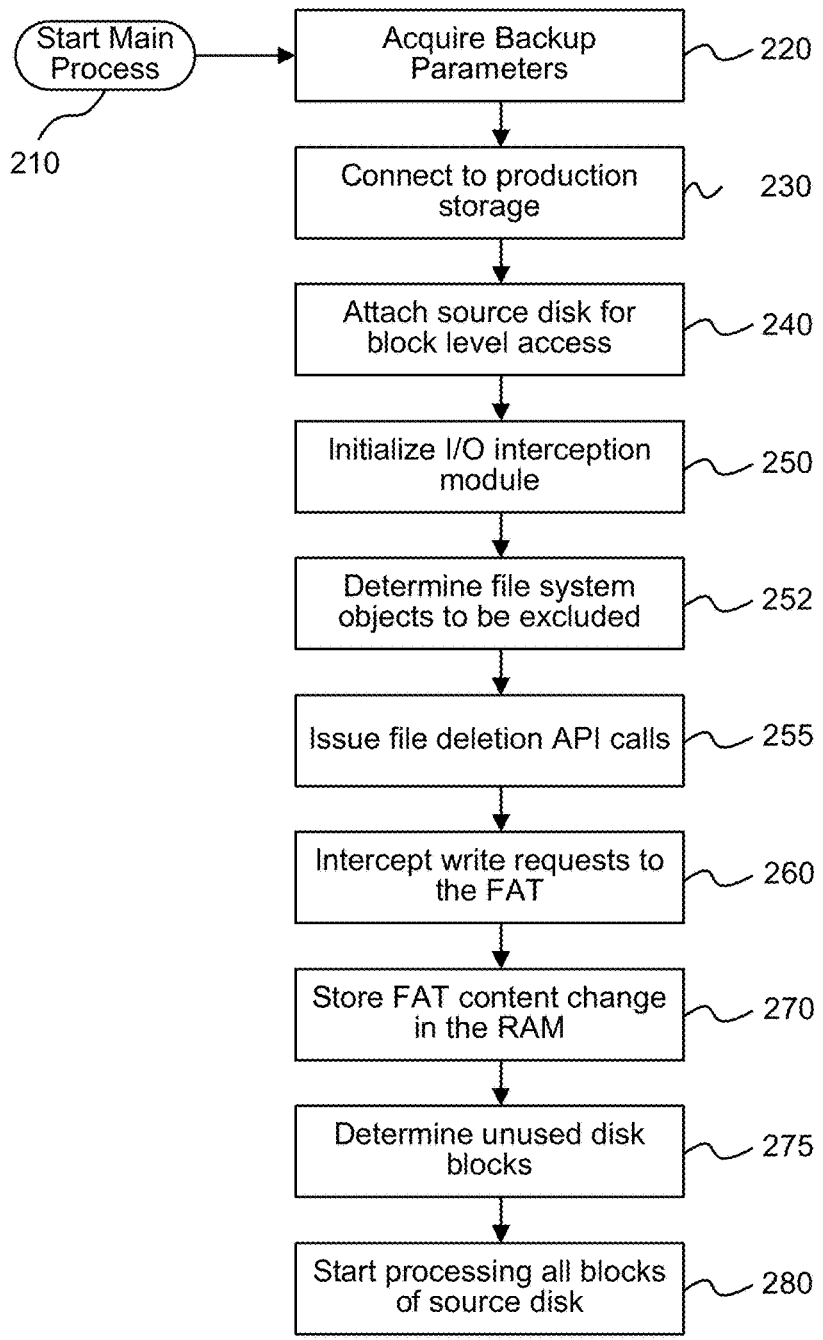
FIGS. 2A and 2B are flowcharts illustrating steps by which selective processing of image level backups are performed, in accordance with an embodiment of the present invention.
Figure 2B:
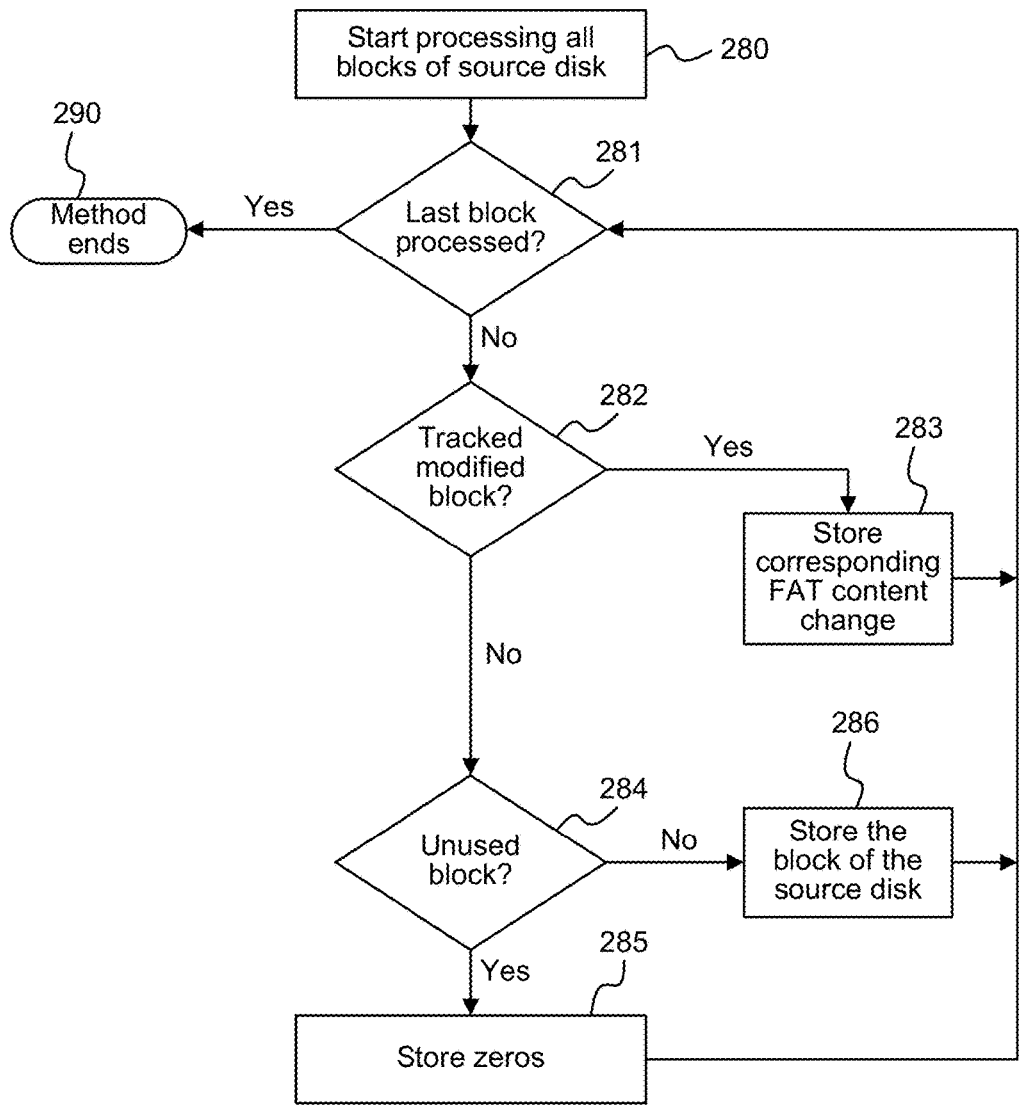

FIGS. 2A and 2B are flowcharts illustrating steps by which backup method 200 is used to process selective image level backups, in accordance with an embodiment of the present invention.

More particularly, the flowcharts illustrate the steps by which file system selective image level backups are performed using a reconstructed disk image, such as reconstructed disk image 170, according to an embodiment of the present invention. FIG. 2A describes preparation steps before backup engine 120 starts to save data to reconstructed disk image 170. FIG. 2B continues from FIG. 2A, illustrating steps by which backup engine 120 saves relevant data to reconstructed disk image 170 using information obtained during the preparation steps described in FIG. 2A. FIGS. 2A and 2B are described with continued reference to the embodiment illustrated in FIG. 1. However, FIGS. 2A and 2B are not limited to that embodiment. Note that the steps in the flowcharts do not necessarily have to occur in the order shown.

As would be understood by one of skill in the relevant art(s), the steps of backup method 200 described below may be accomplished via execution of computer executable instructions that, in response to execution by a computing device, perform an algorithm for creating a selective image level backup.

The method begins at step 210 in FIG. 2A. In an embodiment, a backup application is started in step 210. For example, backup engine 120 and backup operator console 110 may be started in this step. After the backup application is started, the method proceeds to step 220.

In step 220, selective backup parameters 125 are received. Backup parameters 125 may include one or more of physical or virtual machines (VMs) to backup, and a list of file system objects to either include in or exclude from an image level backup. The file system objects may include directories and files, specified individually or using file name masks. In an embodiment, if a directory is selected to be included in an image level backup, all data files in the directory and subdirectories below the selected directory are automatically selected for inclusion in the image level backup. In another embodiment of the invention, if a file system object such as a directory is selected to be excluded from an image level backup, all dependent file system objects, such as files within the excluded directory and all of its subdirectories, will not be processed in the image level backup. According to an embodiment, the list of data items to be included in the backup may be programmatically determined based upon the one or more data items selected by the user to be excluded from the backup. For example, it may programmatically be determined that all files or a predetermined subset of files, except for the user selected one or more files to be excluded, are enumerated and included in the list of file system objects to be backed up. According to an embodiment, backup parameters 125 are received via user input in UI 115 within operator console 110. After receiving backup parameters 125, the method proceeds to step 230.

In step 230, backup engine 120 connects to production disk storage 130 used by the computer selected to be backed up in step 220. As discussed above with reference to FIG. 1, production disk storage 130 comprises one or more disks or (disk images) 140 of the machine to be backed up.

In step 240, backup engine 120 attaches to the required source disk 140. In this step, block level read access is initialized to be able to retrieve and process the data blocks of objects selected in step 220. In case of backup processing for a physical machine, according to an embodiment, an agent inside the processed physical machine can be leveraged to provide backup agent 120 with the processed disk's data. In some embodiments, backup engine 120 attaches to the required source disk 140 as a block device for block level access. Because the required source disk 140 may be a part of production disk storage 130, it is important that the backup process does not alter the content of the required source disk 140. In one embodiment, backup engine 120 attaches to the required source disk 140 as a read-only block device so that backup engine 120 would not change content of the required source disk 140 during backup. After backup engine 120 is attached to production disk storage 130 and disk (s) 140 containing the selected file system objects, the method proceeds to step 250.

In step 250, backup engine 120 initializes I/O interception module 190 on the backup server. After the initialization, I/O interception module 190 can intercept read or write requests to the attached source disk 140. In case of backup processing for a virtual machine, according to an embodiment, I/O interception module 190 uses a plug-in attached to the virtual disk to intercept read or write requests to the source disk 140. In case of backup processing for a physical machine, according to another embodiment, I/O interception module 190 may leverage an agent running on the physical machine to intercept read or write requests to the source disk 140.

In step 252, backup engine 120 determines file system objects of the source disk 140 to be excluded for backup. In some embodiments, backup engine 120 determines file system objects to be excluded for backup based on the selective backup parameters 125. In one embodiment, selective backup parameters 125 specifies a selection of at least one file system object to include in the image level backup. Backup engine 120 determines that all file system objects of the source disk that are not in the selection of at least one file system object are the file system objects to be excluded from the image level backup. In another embodiment, selective backup parameters 125 already specifies a selection of at least one file system object to exclude in the image level backup. Backup engine 120 then determines that all file system objects in the selection of at least one file system object, as specified by selective backup parameters 125, are the file system objects to be excluded for the image level backup.

In step 255, backup engine 120 issues file deletion API calls to initiate deletion of the determined file system objects from the source disk 140. The determined file system objects are the file system objects to be excluded for the image level backup. The issued file deletion API calls would trigger a series of write requests to the attached source disk 140. Because backup engine 120 has already initialized I/O interception module 190, the backup process is capable of intercepting the write requests caused by the file deletion API calls. The series of write requests include write requests to change content of FAT 150 in the source disk 140. The write requests to change the FAT content are triggered by the file deletion API calls. But, as discussed in step 240, the source disk 140 is a part of production disk storage 130, and it is important that the backup process does not alter the content of the source disk 140. The issued file deletion API calls would attempt to delete the determined file system objects by triggering the series of write requests to the source disk 140. Importantly, because backup engine 120 attaches to the source disk 140 as a read-only block device, the issued file deletion API calls would not be capable of actually deleting the determined file system objects from the source disk 140 or change content of FAT 150 in the source disk 140, even in case of unexpected issue with I/O interception module 190.

In step 260, backup engine 120 intercepts write requests to the source disk 140. In one embodiment, backup engine 120 uses I/O interception module 190 to intercept all write requests to the FAT section of the source disk 140. The write requests to change FAT content are caused by the file deletion API calls that attempt to delete the determined file system objects from the source disk 140. Even though the file deletion API calls would not actually delete the determined file system objects or change FAT content of the source disk 140, backup engine 120 can still intercept write requests to the source disk 140, including write requests to change FAT content in the source disk 140, thus making the file deletion API calls to succeed.

In some embodiments, the write requests to change FAT content include block IDs (or block locations) of the disk blocks corresponding to changes to FAT 150 in the source disk 140. The write requests to change FAT content further include changed content of the blocks corresponding to changes to FAT 150 in the source disk 140. In step 270, backup engine 120 extracts the block IDs (or block locations) and changed content of the blocks corresponding to changes to FAT 150 in source disk 140. Backup engine 120 then saves the extracted information on the backup server as FAT content change 195. In one embodiment, backup engine 120 saves FAT content change 195 in the random-access memory (RAM) of the backup server.

After the file deletion API calls issued by backup engine 120 completes, in step 275, backup engine 120 identifies unused disk blocks of the source disk 140 by analyzing FAT structure. The unused disk blocks are the disk blocks that would not correspond to any file system object in the reconstructed disk image 170. In some embodiments, file deletion would result in unused disk blocks. For example, in some file systems, file deletion API calls would not actually reset the content of the corresponding blocks in the source disk. Instead, file deletion API calls simply marks the corresponding disk blocks as deleted without changing the content of the disk blocks. Copying the content of these unused disk blocks from the source disk 140 to the reconstructed disk 170 can waste unnecessary storage resources and impede performance of the backup process.

In one embodiment, the unused disk blocks include disk blocks marked as deleted by file deletion API calls issued by a production server before backup method 200 starts. Backup engine 120 may analyze unchanged portion of FAT 150 in the source disk 140 to identify disk blocks marked as deleted. Further, the unused disk blocks may include disk blocks corresponding to the determined file system objects to be excluded from reconstructed disk image 170, as determined in step 252. Backup engine 120 may analyze the saved FAT content change 195 to identify the unused blocks to be excluded because backup engine 120 intercepts write requests triggered by the file deletion API calls of the file system objects to be excluded. Accordingly, the FAT structure are the combination of information from two sources: (1) unchanged portion of FAT 150 in the attached source disk 140 to identify unused disk blocks caused by file deletion API calls issued by a production server; and (2) the saved FAT content change 195 to identify unused disk blocks caused by file deletion API calls issued by backup engine 120 (i.e., changed portion). In some embodiments, backup engine 120 analyzes the FAT structure by reading unchanged portion of FAT 150 from the source disk 140 and reading changed portion from the saved FAT content change 195 from the RAM of the backup server. In one embodiment, backup engine 120 generates the FAT structure by reading unchanged portion of FAT 150 from the source disk 140 and reading changed portion from the saved FAT content change 195 from the RAM of the backup server. Backup engine 120 can then use the FAT structure to identify unused disk blocks of the source disk 140.

In step 280, backup engine 120 starts to process all disk blocks of the source disk 140. In some embodiments, backup engine 120 starts to sequentially process all disk blocks of the source disk 140. In one embodiment, backup engine 120 uses a block reader to sequentially process each disk block of the source disk 140.

Backup method 200 continues in FIG. 2B. In step 282, during the processing of each encountered disk block of the source disk 140, backup engine 120 decides whether the encountered disk block is tracked as a modified disk block resulted from file deletion API calls in step 255. As described above, file deletion API calls issued by backup engine 120 trigger write requests that attempts to change FAT 150 in the source disk 140. However, the changes are saved to FAT content change 195 on the backup server, rather than saved to the source disk 140. Because FAT content change 195 includes the block IDs (or block locations) and changed content of the blocks corresponding to the attempted changes to FAT 150 in the source disk 140, backup engine 120 may analyze FAT content change 195 to decide whether the encountered disk block is tracked as a modified disk block.

In step 283, if backup engine 120 decides that the encountered disk block is tracked as modified, backup engine 120 stores block content of FAT content change 195 associated with the encountered disk block to the corresponding block in the reconstructed disk image 170. By storing block content of FAT content change 195 rather than storing block content from the source disk 140, FAT 160 of reconstructed disk image 170 includes the correct changed block content because FAT 160 would not include block content that points to disk blocks associated with file system objects to be excluded.

In step 284, backup engine 120 decides whether the encountered disk block is one of the unused disk blocks as identified in step 275. In step 285, if backup engine 120 decides that the encountered disk block is an unused disk block, backup engine 120 stores zeros to the corresponding block in reconstructed disk image 170, rather than storing content from the source disk. In so doing, backup method 200 further improves performance of the backup process because backup engine 120 does not need to read content of the unused blocks from the source disk 140. In addition, step 285 could help reduce the size of compressed image level backups because contiguous zero values in the unused disk blocks compress extremely well by most compression techniques, such as run length encoding (RLE) and advanced run length limited (ARLL).

In step 286, if the encountered disk block is neither a disk block tracked as modified nor an unused disk block, backup engine 120 reads and stores content of the encountered disk block from the source disk 140 to the correspond block in reconstructed disk 170. In one embodiment, if the encountered disk block is neither a disk block tracked as modified nor an unused block, the encountered disk block is associated with a file system object selected for backup, or the encountered disk block is associated with the unmodified portion of the FAT in the source disk 140, then backup engine 120 then stores content of the encountered disk block to the corresponding block in reconstructed disk 170.

In one embodiment, after processing one disk block, backup engine 120 continues to sequentially process the next disk block of the source disk 140. When backup engine 120 finishes processing the last disk block of the attached source disk 140 in step 281, backup method 200 ends at step 290.

Because selective processing of image level backups often does not include all file system objects from a source disk into a destination disk image (i.e., the reconstructed disk image), the FAT in the destination disk usually differs from the FAT in the source disk. Figuring out correct changes to the FAT in the destination disk image can be complex and error-prone. Some backup methods may require processing the source disk and the FAT in the source disk in several passes. On the other hand, backup method 200, as illustrated in exemplary FIGS. 2A and 2B, describes an efficient way for selective processing of image level backups. By issuing file deletion API calls and intercepting write requests triggered by the file deletion API calls, the backup process leverages the operating system to automatically figure out changes to the FAT in order to create the correct reconstructed disk image. The backup method can save changes to the FAT locally on the backup server. The backup method creates the FAT in the reconstructed disk image based on the saved changes to the FAT and the FAT in the source disk. The saved changes to the FAT and the FAT in the source disk further allow the backup method to avoid copying unnecessary disk blocks from the source disk. In some embodiments, backup method 200 only needs to sequentially process all disk blocks of the source disk in one single pass. In addition, attaching to the source disk as a read-only device ensures that the backup process would not alter the content of the disk even if file deletion API calls are issued.

Example Selective Processing User Interface

FIG. 3 illustrates a graphical user interface (GUI), according to an embodiment of the present invention. The GUI depicted in FIG. 3 is described with reference to the embodiments of FIGS. 1 and 2. However, the GUI is not limited to those example embodiments. For example, the GUI may be the UI 115 within operator console 110 used to select selective backup parameters 125, as described in step 220 above with reference to FIG. 2.

Although in the exemplary embodiment depicted in FIG. 3 the GUI is shown as an interface running on a computer terminal, it is understood that the GUI can be readily adapted to execute on a display of other platforms such as mobile device platforms running various operating systems, or another display of a computing device. For example, in an embodiment of the invention, the GUI illustrated in FIG. 3 can be displayed on a mobile device having an input device and a display.

FIG. 3 illustrates an exemplary backup object selection interface 300, wherein one or more file system file system objects from production disk storage 130 of a physical or virtual machine to be backed up can be displayed and selected by a backup operator. As described below and illustrated in FIG. 3, backup object selection interface 300 can be used to select file system objects for either inclusion in or exclusion from backup data 175.

According to an embodiment, by clicking, using an input device (not shown), include button 306, a backup operator can browse a list of displayed file system objects from the selected machine's production disk storage 130. In an embodiment, a backup operator, using an input device (not shown), selects Add button 308 to select one or more of the displayed file system objects to be included in backup 175. For example, through moving a pointer or cursor within file system objects displayed in as result of clicking include button 306 and subsequently selecting Add button 308, a backup operator selects one or more file system objects to be processed from production disk storage 130 and included in reconstructed disk image 170. According to an embodiment of the present invention, a backup operator can select one or more file system objects (e.g., "d:\Share\Home Folders" in the exemplary embodiment of FIG. 3) by either typing in the object name(s) or browsing to the location of the file system object(s) within production disk storage 130. A backup operator can remove previously added file system objects from a backup by clicking on Remove button 310.

One or more file system objects can be selected for inclusion in backup 175 by clicking on the file system objects displayed within backup object selection interface 300 and clicking Add button 308. Once the backup operator has finished selecting file system objects, backup parameters are saved by clicking on OK button 312. According to an embodiment, once the backup operator clicks OK button 312, backup parameters 125 are saved as VM processing settings to be used by backup engine 120. The current file system object selections can be canceled by clicking on Cancel button 314.

In an embodiment, file system objects to be excluded from backup 175 can be selected by clicking on exclude button 304. By clicking, using an input device (not shown), include button 306, a backup operator can browse a list of displayed file system objects from the selected machine's production disk storage 130. Add button 308 allows a backup operator to add one or more file system objects or environment variables (e.g., "c:\pagefile.sys,", "c:\hyberfil.sys," and "% TEMP %" in the exemplary embodiment of FIG. 3) to a list of file system objects to be excluded from backup 175. In an embodiment, a backup operator, using an input device (not shown), selects Add button 308 to select one or more of the displayed file system objects to be excluded from backup 175. For example, through moving a pointer or cursor within file system objects displayed in as result of clicking exclude button 304 and subsequently selecting Add button 308, a backup operator selects one or more file system objects that will not be read from production disk storage 130 and to be excluded from reconstructed disk image 170. A backup operator can remove previously added file system objects from the backup exclusion list by clicking on Remove button 310.

According to an embodiment, disable button 302 can be selected if the backup operator does not wish to select individual file system objects to be included in or excluded from backup 175.

As described above with reference to FIGS. 1, 2A, and 2B, a selective image level backup is subsequently performed based upon backup parameters 125 selected and saved in backup object selection interface 300. In an embodiment, the display may be a computer display 430 shown in FIG. 4, and backup object selection interface 300 may be display interface 402. According to embodiments of the present invention, the input device can be, but is not limited to, for example, a touch screen, a keyboard, a pointing device, a track ball, a touch pad, a joy stick, a voice activated control system, or other input devices used to provide interaction between a backup operator and backup object selection interface 300.

Example Computer System Implementation

Figure 4:
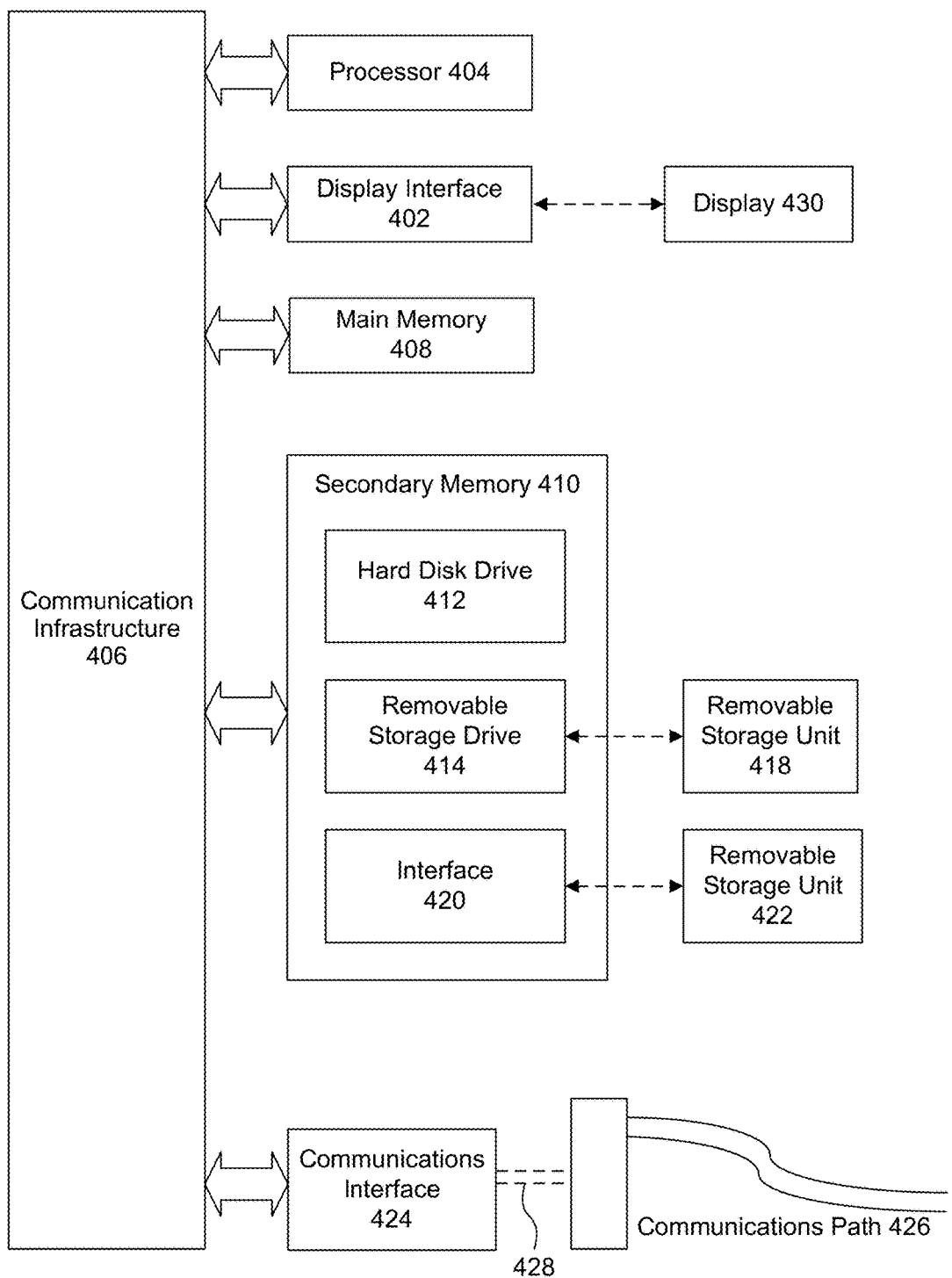
FIG. 4 depicts an example computer system in which an embodiment of the present invention may be implemented.

Various aspects of the present invention can be implemented by software, firmware, hardware, or a combination thereof. FIG. 4 illustrates an example computer system 400 in which the present invention, or portions thereof, can be implemented as computer-readable code. For example, the methods illustrated by the flowcharts of FIGS. 2A and 2B can be implemented in system 400. Selective backup processing architecture 100 of FIG. 1 can also be implemented in system 400. Various embodiments of the invention are described in terms of this example computer system 400. After reading this description, it will become apparent to a person skilled in the relevant art how to implement the invention using other computer systems and/or computer architectures.

Computer system 400 includes one or more processors, such as processor 404.

Processor 404 can be a special purpose or a general-purpose processor. Processor 404 is connected to a communication infrastructure 406 (for example, a bus, or network).

Computer system 400 also includes a main memory 408, preferably random access memory (RAM), and may also include a secondary memory 410. Secondary memory 410 may include, for example, a hard disk drive 412, a removable storage drive 414, flash memory, a memory stick, and/or any similar non-volatile storage mechanism. Removable storage drive 414 may comprise a floppy disk drive, a magnetic tape drive, an optical disk drive, a flash memory, or the like. The removable storage drive 414 reads from and/or writes to a removable storage unit 418 in a well-known manner. Removable storage unit 418 may comprise a floppy disk, magnetic tape, optical disk, etc. which is read by and written to by removable storage drive 414. As will be appreciated by persons skilled in the relevant art(s), removable storage unit 418 includes a non-transitory computer usable storage medium having stored therein computer software and/or data.

In alternative implementations, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 may also include a communications interface 424. Communications interface 424 allows software and data to be transferred between computer system 400 and external devices. Communications interface 424 may include a modem, a network interface (such as an Ethernet card), a communications port, a PCMCIA slot and card, or the like.

Computer system 400 may additionally include computer display 430. According to an embodiment, computer display 430, in conjunction with display interface 402, can be used to display UI 115 on operator console 110. Computer display 430 may also be used to display backup object selection interface 300 depicted in FIG. 3.

In this document, the terms "computer program medium," "non-transitory computer readable medium," and "computer usable medium" are used to generally refer to media such as removable storage unit 418, removable storage unit 422, and a hard disk installed in hard disk drive 412. Computer program medium, computer readable storage medium, and computer usable medium can also refer to memories, such as main memory 408 and secondary memory 410, which can be memory semiconductors (e.g. DRAMs, etc.). These computer program products are means for providing software to computer system 400.

Computer programs (also called computer control logic) are stored in main memory 408 and/or secondary memory 410. Computer programs may also be received via communications interface 424. Such computer programs, when executed, enable computer system 400 to implement the present invention as discussed herein. In particular, the computer programs, when executed, enable processor 404 to implement the processes of the present invention, such as the steps in the methods illustrated by the flowcharts of FIGS. 2A and 2B, and system architecture 100 of FIG. 1 discussed above. Accordingly, such computer programs represent controllers of the computer system 400. Where the invention is implemented using software, the software may be stored in a computer program product and loaded into computer system 400 using removable storage drive 414, interface 420, hard drive 412, or communications interface 424.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

CONCLUSION

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for selective processing of file system objects for an image level backup, comprising:
   receiving, by at least one processor, a backup parameter for an image level backup, wherein the backup parameter comprises a selection of a file system object to be included in the image level backup;
   by the at least one processor, attaching to a source disk using block level access, wherein the source disk comprises the selected file system object and a file system that comprises a file allocation table (FAT);
   determining, by the at least one processor, another file system object of the source disk is to be excluded for the image level backup based on the selected file system object;
   issuing, by the at least one processor, a file deletion application programming interface (API) call to the source disk to initiate deletion of the determined another file system object from the source disk;
   intercepting, by the at least one processor, a write request to the FAT on the source disk based on the file deletion API call;
   storing, by the at least one processor, a FAT content change based on the intercepted write request; and
   creating, by the at least one processor, a reconstructed disk image from the source disk based on the stored FAT content change.

2. The method of claim 1, further comprising initializing an input/output (I/O) interception module, and wherein the storing the FAT content change comprises:
   storing the FAT content change in a random access memory based on the intercepted write request.

3. The method of claim 1, wherein the determining comprises:
   determining that the another file system object of the source disk is different than the selected file system object.

4. The method of claim 3, further comprising:
   after completing; the file deletion API call, identifying unused disk blocks of the source disk by analyzing the FAT in the source disk and the FAT content change.

5. The method of claim 4, further comprising:
   reading an unchanged portion of the FAT in the source disk and a changed portion from the FAT content change.

6. The method of claim 4, wherein the creating comprises:
   determining a disk block is tracked as a modified disk block based on the FAT content change; and
   storing block content from the FAT content change associated with the disk block to a corresponding disk block in the reconstructed disk image.

7. The method of claim 4, wherein the creating comprises:
   determining a disk block is an unused disk block in the identified unused disk blocks; and
   storing zeros to a corresponding disk block in the reconstructed disk image.

8. A system for selective processing of file system objects for an image level backup, comprising:
   a memory; and
   at least one processor coupled to the memory and configured to:
   receive a backup parameter for an image level backup, wherein the backup parameter comprises a selection of a file system object to be included in the image level backup;
   attach to a source disk using block level access, wherein the source disk comprises the selected file system object and a file system that comprises a file allocation table (FAT);
   determine another file system object of the source disk is to be excluded for the image level backup based on the selected file system object;
   issue a file deletion application programming interface (API) call to the attached source disk to initiate deletion of the determined another file system object from the source disk;
   intercept a write request to the FAT on the attached source disk based on the file deletion API call;
   store a FAT content change based on the intercepted write request; and
   create a reconstructed disk image from the source disk based on the stored FAT content change.

9. The system of claim 8, wherein the at least one processor is further configured to initialize an input/output (I/O) interception module, and to store the FAT content change, the at least one processor is further configured to:
   store the FAT content change in the memory based on the intercepted write request.

10. The system of claim 8, wherein, to determine the another file system object of the source disk is to be excluded from the image level backup, the at least one processor is further configured to:
    determine that the another file system object of the source disk is different than the selected file system object.

11. The system of claim 10, wherein the at least one processor is further configured to:
    after completing the file deletion API call, identify unused disk blocks of the source disk by analyzing the FAT in the source disk and the FAT content change.

12. The system of claim 11, wherein the at least one processor is further configured to:
read an unchanged portion of the FAT in the source disk and a changed portion from the FAT content change.

13. The system of claim 11, wherein, to create the reconstructed disk image, the at least one processor is further configured to:
determine a disk block is tracked as a modified disk block based on the FAT content change: and
store block content from the FAT content change associated with the disk block to a corresponding disk block in the reconstructed disk image.

14. The system of claim 13, wherein, to create the reconstructed disk image, the at least one processor is further configured to:
determine a disk block is an unused disk block in the identified unused disk blocks; and store zeros to a corresponding disk block in the reconstructed disk image.

15. A non-transitory computer-readable medium having instructions stored thereon that, when executed by at least one computing device, cause the at least one computing device to perform operations for selective processing of file system objects for an image level backup, comprising:
receiving a backup parameter for an image level backup, wherein the backup parameter comprises a selection of a file system object to be included in the image level backup;
attaching to a source disk using block level access, wherein the source disk comprises the selected file system object and a file system that comprises a file allocation table (FAT);
determining another file system object of the source disk is to be excluded for the image level backup based on the selected file system object;
issuing a file deletion application programming interface (API) to the attached source disk to initiate deletion of the determined another file system object from the source disk;
intercepting a write request to the FAT on the source disk based on the file deletion API call;
storing a FAT content change based on the intercepted write request; and
creating a reconstructed disk image from the source disk based on the stored FAT content change.

16. The non-transitory computer-readable medium of claim 15, wherein the operations further comprise initializing an input/output (I/O) interception module, and the storing the FAT content change comprises:
storing the FAT content change in a random access memory based on the intercepted write request.

17. The non-transitory computer-readable medium of claim 15, wherein the determining comprises:
determining that the another file system object of the source disk is different than the selected file system object.

18. The non-transitory computer-readable medium of claim 17, wherein the operations further comprise:
after completing the file deletion API call, identifying unused disk blocks of the source disk by analyzing the FAT in the source disk and the FAT content change.

19. The non-transitory computer-readable medium of claim 18, wherein the operations further comprise:
reading an unchanged portion of the FAT in the source disk and a changed portion from the FAT content change.

20. The non-transitory computer-readable medium of claim 18, wherein the creating comprises:
determining a disk block is tracked as a modified disk block based on the FAT content change; and
storing, block content from the FAT content change associated with the disk block to a corresponding disk block in the reconstructed disk image.

21. The non-transitory computer-readable medium of claim 18, wherein the creating comprises:
determining a disk block is an unused disk block in the identified unused disk blocks; and storing zeros to a corresponding disk block in the reconstructed disk image.

* * * * *

UNITED STATES PATENT AND TRADEMARK OFFICE
CERTIFICATE OF CORRECTION

PATENT NO.        : 10,157,103 B2
APPLICATION NO.   : 14/918453
DATED             : December 18, 2018
INVENTOR(S)       : Gostev et al.

Page 1 of 1

It is certified that error appears in the above-identified patent and that said Letters Patent is hereby corrected as shown below:

In the Claims

Column 16, Line 7, Claim 4 please replace "after completing; the file deletion" with –after completing the file deletion–.

Column 17, Line 9, Claim 13 please replace "the FAT content change: and" with –the FAT content change; and–.

Column 18, Line 31, Claim 20 please replace "storing; block content" with –storing block content–.

Signed and Sealed this
Twenty-eighth Day of April, 2020

Andrei Iancu
*Director of the United States Patent and Trademark Office*